(12) United States Patent
Gimenez Manent et al.

(10) Patent No.: US 10,569,467 B2
(45) Date of Patent: *Feb. 25, 2020

(54) SUPPLYING BUILD MATERIAL

(71) Applicants: Hewlett-Packard Development Company, L.P., Houston, TX (US);
Jordi Gimenez Manent, Rubi (ES);
Jose Manuel Grases, Barcelona (ES);
Francisco Jaime, Barcelona (ES);
Fernando Juan, Viladecavalls (ES);
Pau Martin Vidal, Barcelona (ES);
Marius Valles, Barcelona (ES)

(72) Inventors: Jordi Gimenez Manent, Rubi (ES);
Jose Manuel Grases, Barcelona (ES);
Francisco Jaime, Barcelona (ES);
Fernando Juan, Viladecavalls (ES);
Pau Martin Vidal, Barcelona (ES);
Marius Valles, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/565,648

(22) PCT Filed: Jul. 7, 2015

(86) PCT No.: PCT/EP2015/065454
§ 371 (c)(1),
(2) Date: Oct. 10, 2017

(87) PCT Pub. No.: WO2017/005301
PCT Pub. Date: Jan. 12, 2017

(65) Prior Publication Data
US 2018/0071985 A1    Mar. 15, 2018

(51) Int. Cl.
*B29C 64/329* (2017.01)
*B33Y 10/00* (2015.01)
(Continued)

(52) U.S. Cl.
CPC .......... *B29C 64/329* (2017.08); *B29C 64/153* (2017.08); *B29C 64/20* (2017.08);
(Continued)

(58) Field of Classification Search
CPC ... B29C 64/153; B29C 64/241; B29C 64/255; B29C 64/321; B29C 64/343;
(Continued)

(56) References Cited

U.S. PATENT DOCUMENTS 5,260,009 A    11/1993  Penn
8,568,124 B2 * 10/2013  Brunermer ............ B05C 11/026
                                                    118/106
(Continued)

FOREIGN PATENT DOCUMENTS

WO    WO 95/34468        12/1995
WO    WO-2014044676 A1 *  3/2014  ............. B33Y 30/00

OTHER PUBLICATIONS

International Search Report and Written Opinion for International Application No. PCT/EP2015/065454 dated Mar. 4, 2016, 12 pages.
(Continued)

*Primary Examiner* — Michael N Orlando
*Assistant Examiner* — Christopher W Raimund
(74) *Attorney, Agent, or Firm* — HP Inc. Patent Department

(57) ABSTRACT

A method of delivering build material from a build material store (404) to a supply module (102). The method comprises moving, using a rotatable vane (116), a portion of build material from the supply module (102) to the top of the
(Continued)

supply module (102), and spreading the moved portion of build material across the support platform (104).

11 Claims, 9 Drawing Sheets

(51) Int. Cl.
    *B33Y 30/00*         (2015.01)
    *B33Y 40/00*         (2015.01)
    *B29C 64/20*          (2017.01)
    *B29C 64/153*       (2017.01)
    *B29C 64/218*       (2017.01)

(52) U.S. Cl.
    CPC ............... *B33Y 10/00* (2014.12); *B33Y 30/00* (2014.12); *B33Y 40/00* (2014.12); *B29C 64/218* (2017.08)

(58) Field of Classification Search
    CPC ... B29C 64/393; B29C 64/329; B29C 64/218; B29C 64/20; B33Y 10/00; B33Y 30/00; B33Y 40/00
    See application file for complete search history.

(56) References Cited

U.S. PATENT DOCUMENTS

| | | |
|---|---|---|
| 2005/0225007 A1 | 10/2005 | Lai et al. |
| 2007/0298182 A1 | 12/2007 | Perret et al. |
| 2008/0108513 A1 | 6/2008 | Perret et al. |
| 2010/0151136 A1* | 6/2010 | Davidson ................ B29C 41/12 427/356 |
| 2010/0244333 A1 | 9/2010 | Bedal et al. |
| 2011/0109016 A1* | 5/2011 | Fuwa .................... B22F 3/1055 264/460 |
| 2014/0065194 A1 | 3/2014 | Yoo et al. |
| 2014/0263209 A1 | 9/2014 | Burris et al. |

OTHER PUBLICATIONS

Langnau, L. "New Dimensions in 3D Printing: FreeForm Fabrication" Make Parts Fast 2014 3 pgs http://www.makepartsfast.com/2014/08/1323/new-dimensions-3d-printing-fabrication/.

* cited by examiner

SUPPLYING BUILD MATERIAL

BACKGROUND

Additive manufacturing techniques, such as three-dimensional (3D) printing, enable objects to be generated on a layer-by-layer basis. 3D printing techniques may generate layers of an object by forming successive layers of a build material on a build or support platform, and selectively solidifying portions of each layer of the build material.

BRIEF DESCRIPTION

Examples will now be described, by way of non-limiting example only, with reference to the accompanying drawings, in which.

DETAILED DESCRIPTION

Some 3D printing systems use build material that have a powdered, or granular, form. According to one example a suitable build material may be a powdered semi-crystalline thermoplastic material. One suitable material may be Nylon 12, which is available, for example, from Sigma-Aldrich Co. LLC. Another suitable material may be PA 2200 which is available from Electro Optical Systems EOS GmbH.

In other examples other suitable build material may be used. Such materials may include, for example, powdered metal materials, powdered plastics materials, powdered composite materials, powdered ceramic materials, powdered glass materials, powdered resin material, powdered polymer materials, and the like.

Such 3D printing systems typically generate, along a side of a support platform, a quantity of build material to be spread over the support platform. During a 3D printing operation, an initial layer of build material is spread directly on the surface of a support platform, whereas subsequent layers of build material are formed on a previously formed layer of build material. Herein, reference to forming a layer of build material on the support platform may refer to, depending on the context, either forming a layer of build material directly on the surface of the support platform, or forming a layer of build material on a previously formed layer of build material.

Various examples will now be described that provide a compact and convenient system for providing build material to be spread over a support platform, for example for use in the generation of 3D objects by a 3D printing system. Some examples enable a precise dose of build material to be formed along the edge of a support platform. The dose of build material may then be spread over the build, or support, platform using a build material spreading mechanism. Forming a precise dose of build material may be useful, for example, for reducing the amount of excess build material remaining after a layer of build material has been formed, for ensuring that sufficient build material is provided to enable a complete layer of build material to be formed, and for reducing the amount of build material that could become airborne whilst forming a layer of build material.

Figure 1:
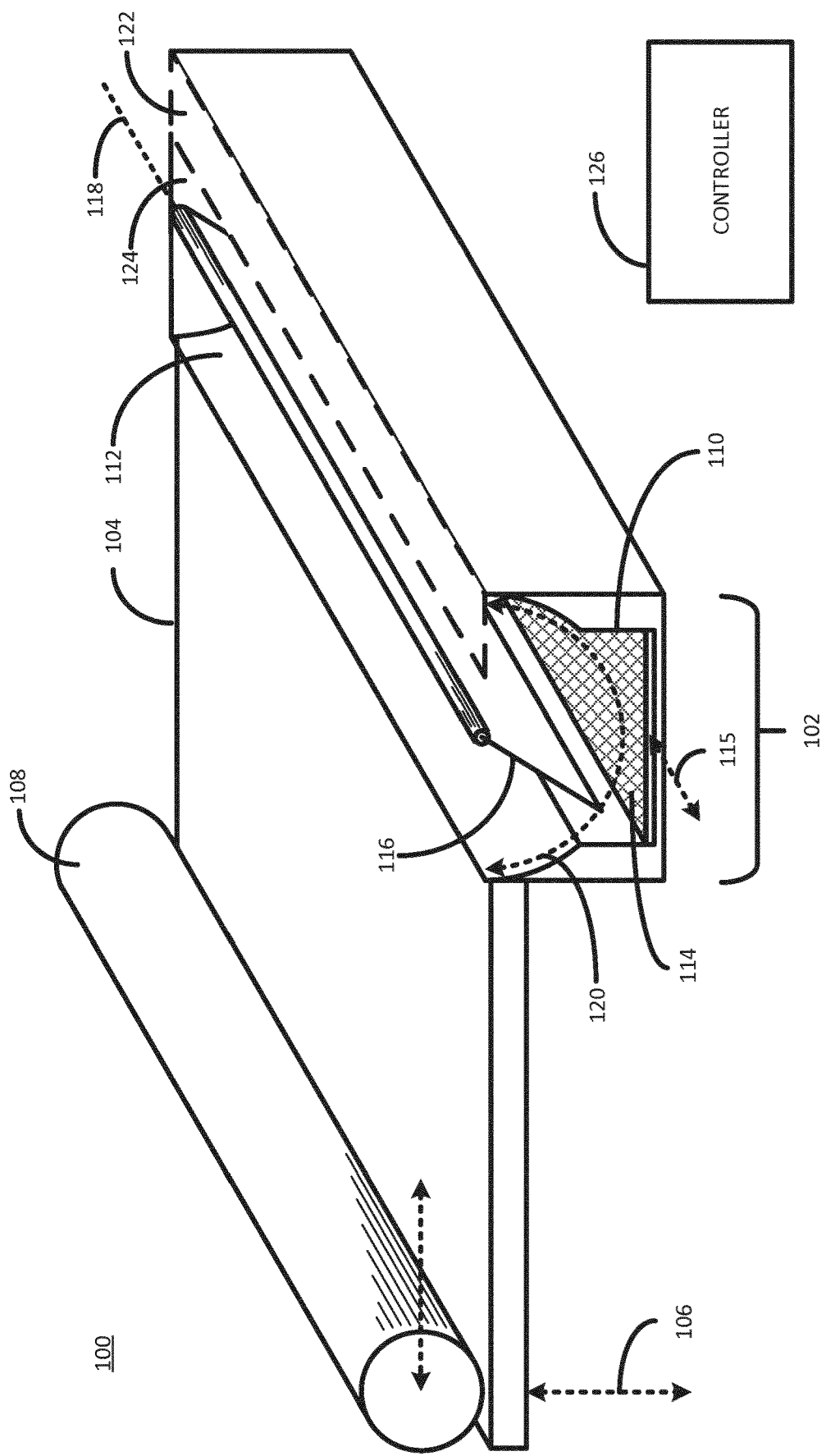
FIG. 1 is a simplified isometric illustration of a portion of 3D printing system according to one example.

Referring now to FIG. 1 there is shown an illustration of a portion of a 3D printing system 100 according to one example. For clarity reasons not all the elements of the 3D printing system 100 are shown. For example, the illustrations shown herein do not show any specific build material solidification systems, although any suitable build material solidification systems may be used, such as fusing agent deposition and heating systems, binder agent deposition systems, laser sintering systems, and the like.

The system 100 comprises a build material supply module or supply tray, generally indicated at 102, to provide a quantity of build material to be spread across a support platform 104 by a horizontally movable build material spreader, or build material distributor, 108. The spreader 108 may be mounted on a suitable carriage or gantry (not shown). The support platform 104 may be movable in the z-axis, as indicated by arrow 106, to enable it to be lowered as each layer of build material formed thereon is processed by the 3D printing system 100. In the example shown the build material spreader 108 is a roller, although in other examples other suitable forms of spreader, such as a wiper blade, may be used. Build material is supplied to the supply module 102 from a build material store (not shown). In one example, as described later, the build material store may be located below the height of the supply module 102.

The build supply module 102 has length that, in one example, is substantially the same as the length of the support module 104. In other examples, however, the supply module 102 may be longer or shorter than the support platform 104.

The supply module 102 forms a generally open container in which build material may be deposited and from which build material may be moved to enable it be spread over the support platform 104. In FIG. 1, the foreground endplate of the supply module 102 is not shown so as to allow the internal structure of the supply module 102 to be visible. The supply module 102 has a cross-section formed from rectangular base portion 110, and a curved upper portion 112. The curved upper portion 112 has a cross-section that defines two arcs of a circle having its center located along an axis 118 positioned centrally above the longitudinal axis of the base portion 110 and about level with the top of the supply module 102, and having a predetermined radius.

The base portion 110 may comprise a reciprocating build material distribution element 114 movable in the direction shown by arrow 115. The build material distribution element 114 may be controlled to reciprocate, or slide, along the base of the supply module 102, by a small amount to help distribute build material within the supply module 102, as described further below. In one example the build material distribution element 114 may be controlled to slide by up to about 1 cm, although in other examples the build material distribution element 114 may be controlled to slide by a greater or smaller amount. In one example the build material distribution element 114 may comprise a mesh-like structure and be driven by any suitable drive system, such as a motor.

The supply module 102 further comprises a vane, or blade, 116 that is rotatable about the axis 118, as shown by arrow 120. The vane has a height such that during its rotation the base of the vane may form a substantial seal against the curved upper portion 112, enabling it to move build material from the base portion 110 to the curved upper portion 112.

The vane 116 may be driven by any suitable drive mechanism (not shown), such as a stepper motor, rack and pinion arrangement, or the like and may additionally be coupled to a position determination module (not shown), such as an angular encoder, to enable the angular position of the vane to be accurately controlled and determined.

In some examples the supply module 102 may further comprise a horizontal protrusion 122 that defines a gap, or void, 124 between the top of the vane 116 and one longitudinal edge of the protrusion 122. In other examples, however, there may be no protrusion 122 in which case a gap or void 124 may be defined between the top of the vane 116 and one side of the supply module 102, as illustrated. In some examples the protrusion 122 may not be horizontal, and may be inclined.

Figure 2:
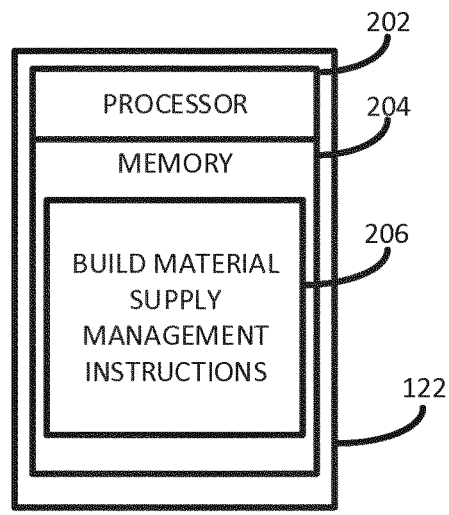
FIG. 2 is a block diagram of a 3D printer controller according to one example.

Operation of the 3D printing system 100 is generally controlled by a controller 126, as shown in greater detail in FIG. 2.

The controller 126 comprises a processor 202 coupled to a memory 204. The memory 204 stores build material supply management instructions 206 that, when executed by the processor 202, control the 3D printing system 100 to manage the supply of build material, as described herein.

Figure 3:
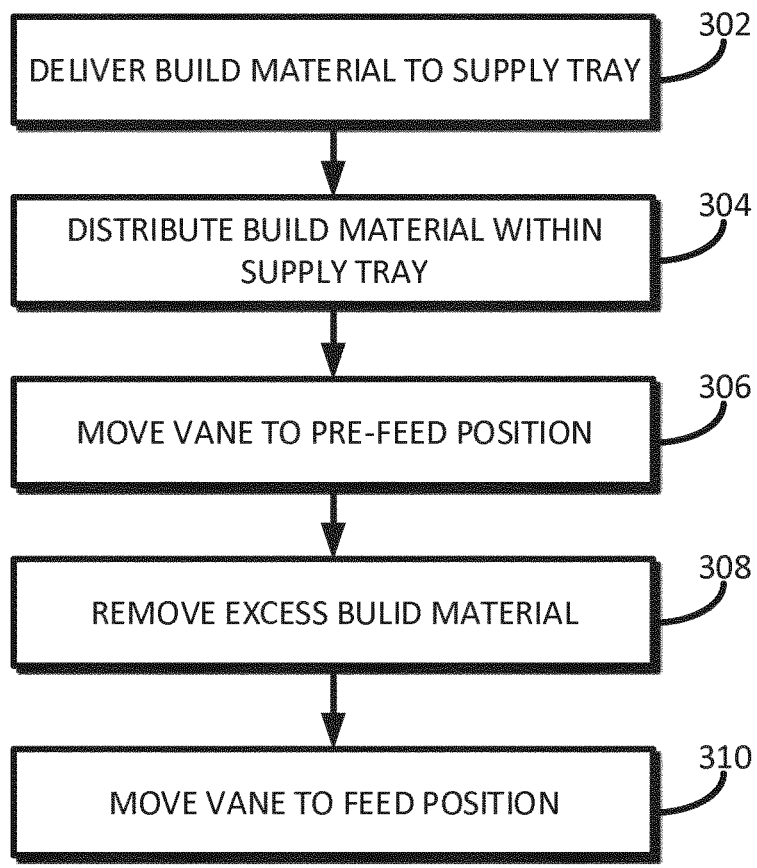
FIG. 3 is a flow diagram outlining an example method according to one example.

Operation of the 3D printing system 100 will now be described with reference to the flow diagram of FIG. 3 and the drawings of FIGS. 4 to 10.

Figure 4:
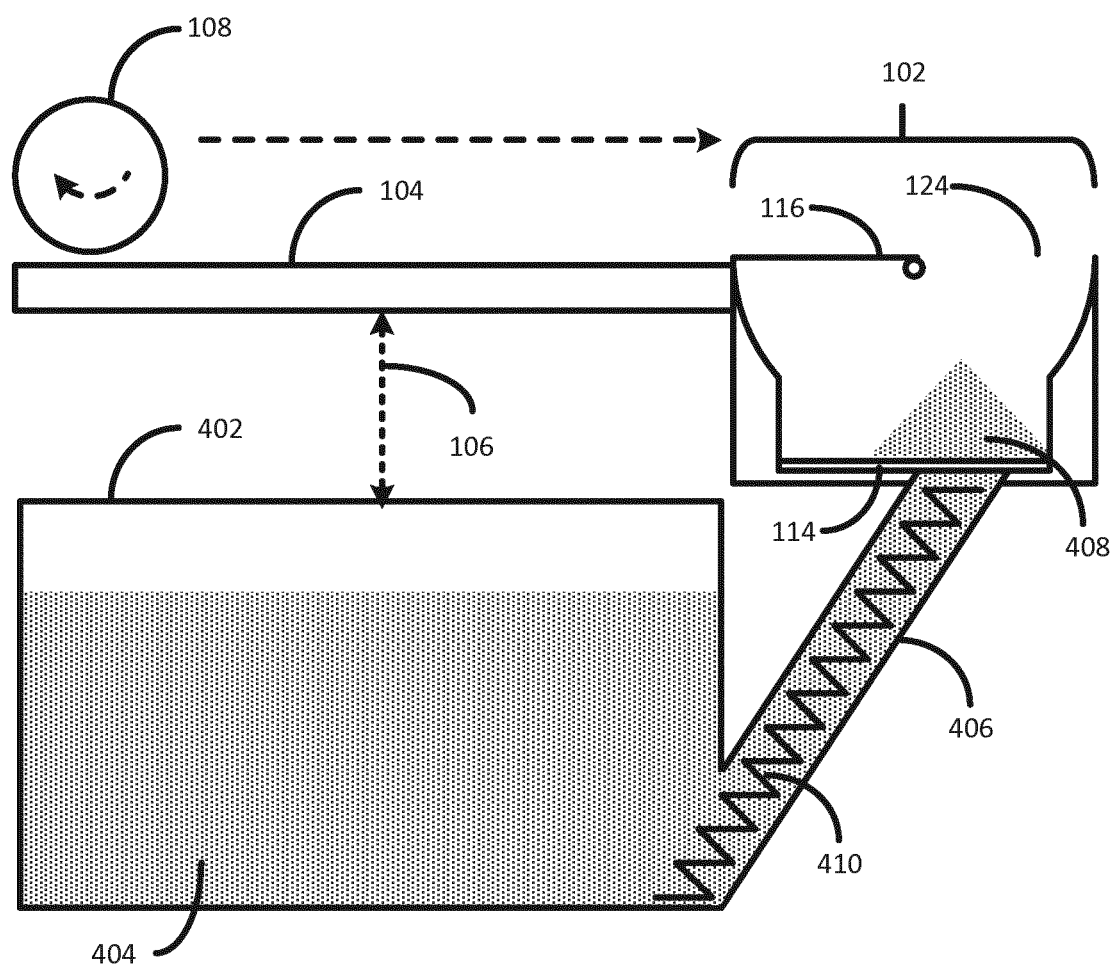
FIG. 4 is a simplified side view illustration of a 3D printing system according to one example.

At 302, the controller 126 controls the delivery of build material to the supply module 102. One example of how build material may be delivered to the supply module 102 is shown in FIG. 4. In FIG. 4 is shown a main build material store 402 comprising build material 404 and a feed channel 406 to move build material 404 from the build material store 402 to a delivery zone 408. The feed channel 406 comprises a feed mechanism, such as an auger screw 410, or any other suitable feed mechanism.

In one example the build material feed mechanism 410 may be controlled to deliver a predetermined amount of build material to the supply module 102. For example, if an auger screw mechanism is used as the feed mechanism, the number of rotations of the auger screw may be controlled to deliver the predetermined amount of powder. If an accurate amount of build material can be delivered by the feed mechanism 410, then in one example the protrusion 122 may be absent from the supply module 102, as in FIGS. 4, 5, 6, and 7.

The delivery zone 408 may be positioned at any suitable position along the length of the supply module 102, but in at least some examples the delivery zone 408 does not extend substantially along the length of the supply module. For example, the delivery zone may have a length that is less than about 10% of the length of the supply module 102 in some examples.

The build material store 402 may, in one example, additionally include a vibrator or compactor (not shown) to help ensure that build material 404 within the build material store 402 compacts around the lower end of the feed mechanism 410, to ensure a regular supply of build material to the feed mechanism 410.

Having a build material store located generally beneath the support platform 104 and supply module 102 enables the footprint of such a 3D printing system to be reduced, compared to having a build material store located at one side of the 3D printing system.

In other examples build material may be delivered to the supply module 102 using other suitable configurations such as, for example, from an overhead build material hopper.

Figure 5:
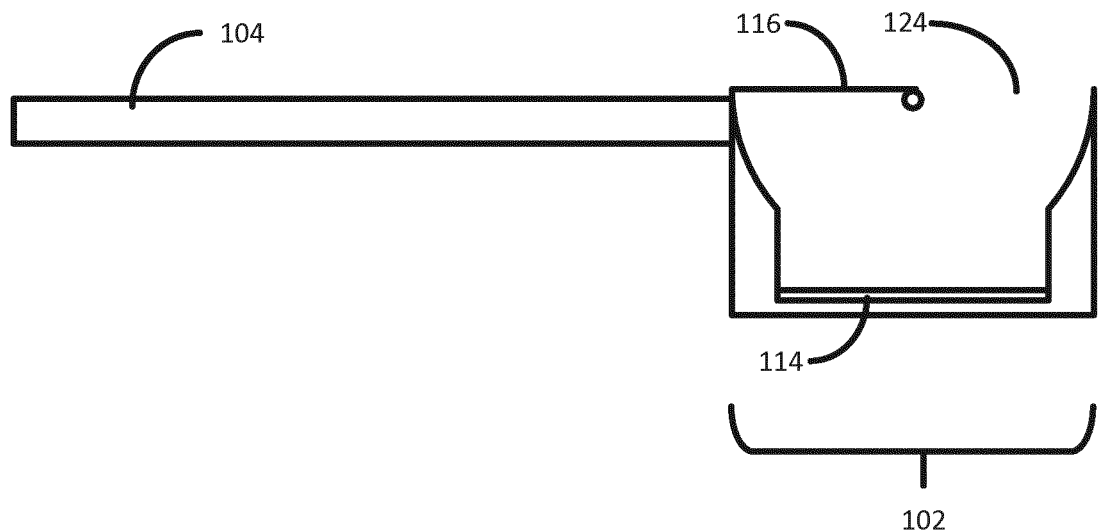
FIG. 5 is a simplified side view illustration of a 3D printing system according to one example.

At 304, the controller 126 controls the build material distribution element 114 to reciprocate to evenly distribute the delivered build material 402 along the length of the supply module 102. In one example, as build material is being delivered to the supply module 102, the controller 126 moves the vane 116 to a position, such as a horizontal position as shown in FIG. 5. In one example when the vane 116 is in a horizontal position it is level with the top of the supply module 102.

Figure 6:
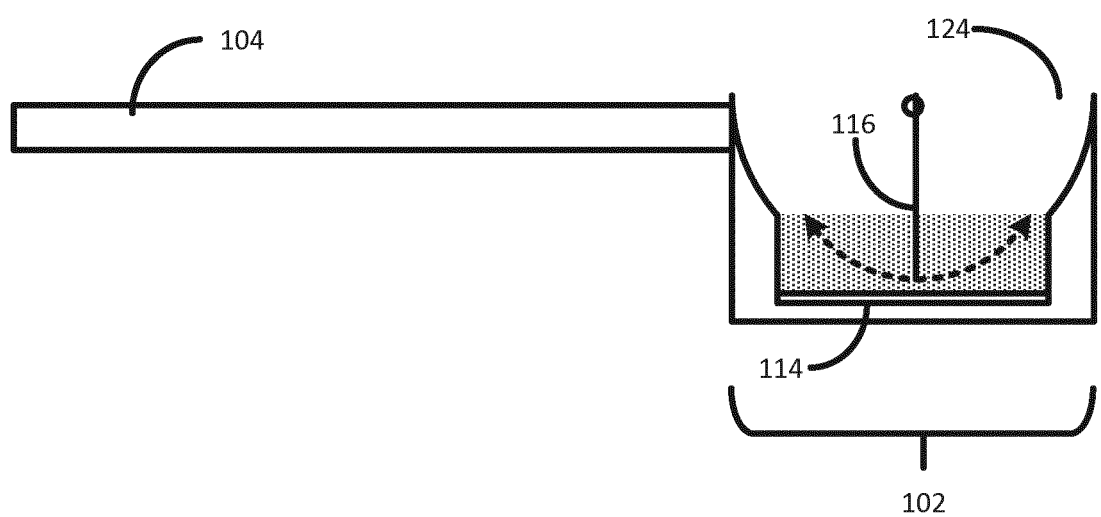
FIG. 6 is a simplified side view illustration of a 3D printing system according to one example.

In a further example, illustrated in FIG. 6, as build material is being delivered to the supply module 102 the controller 126 may control the vane 116 to move from a roughly vertical position, in which the lower edge of the vane is within the rectangular base portion 110, to reciprocate, up to about 45 degrees to either side. This may help, in conjunction with the reciprocating build material distribution element 114, the rapid and even distribution of build material along the length of the supply module 102. This may also help in maintaining the fluidity of the build material.

Figure 7A:
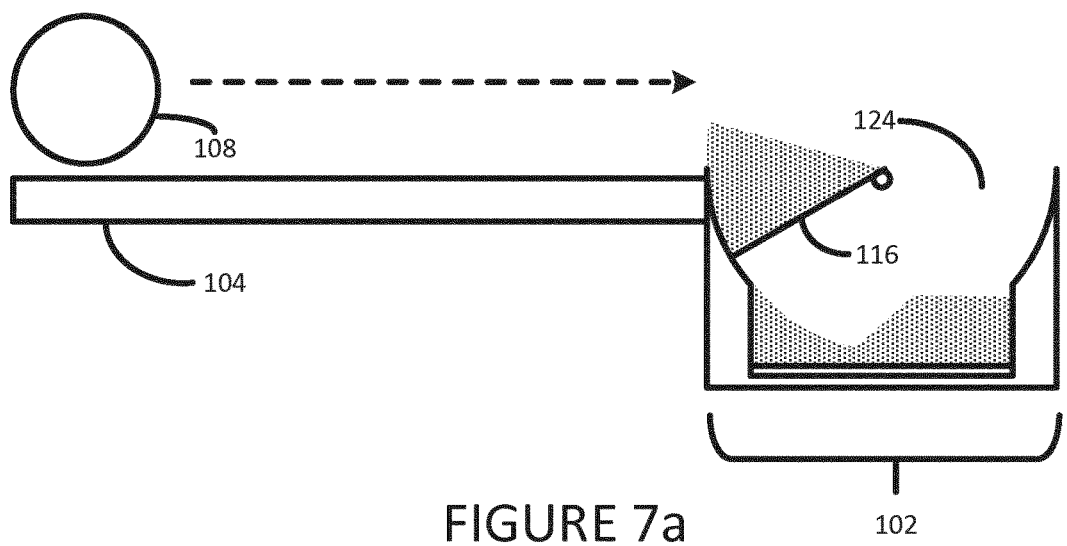
FIGS. 7a to 7d are simplified side view illustrations of a 3D printing system according to one example.

At 306 the controller 126 controls the vane 116 to move to a pre-feed position, as illustrated in FIG. 7a. Since the vane 116 has moved through the delivered build material in the supply module 102 it scoops up some of the build material such that a first portion of the scooped up build material is above the top of the supply module 102 and a second portion is below the top of the supply module 102.

Figure 7B:
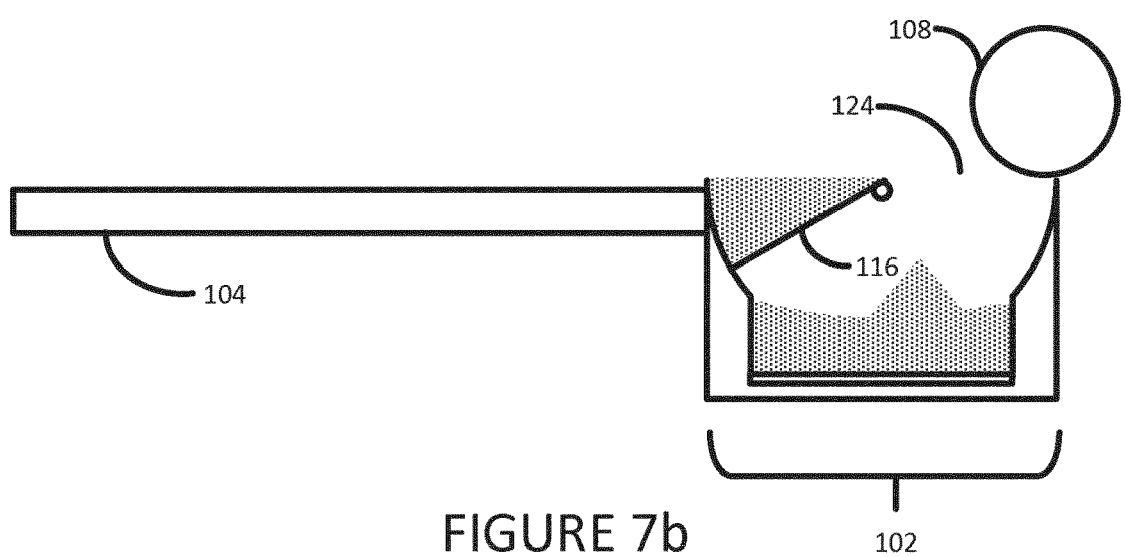

At 308, the controller 126 controls the build material spreader 108 to move across at least a portion of the support platform 104 and over the void 124 such the first portion of build material is displaced and falls back into the supply module 102 leaving a predetermined dose of build material being retained by the vane 116, as shown in FIG. 7b. The quantity of build material in the predetermined dose may be modified by changing the angular position of the pre-feed position.

Figure 7C:
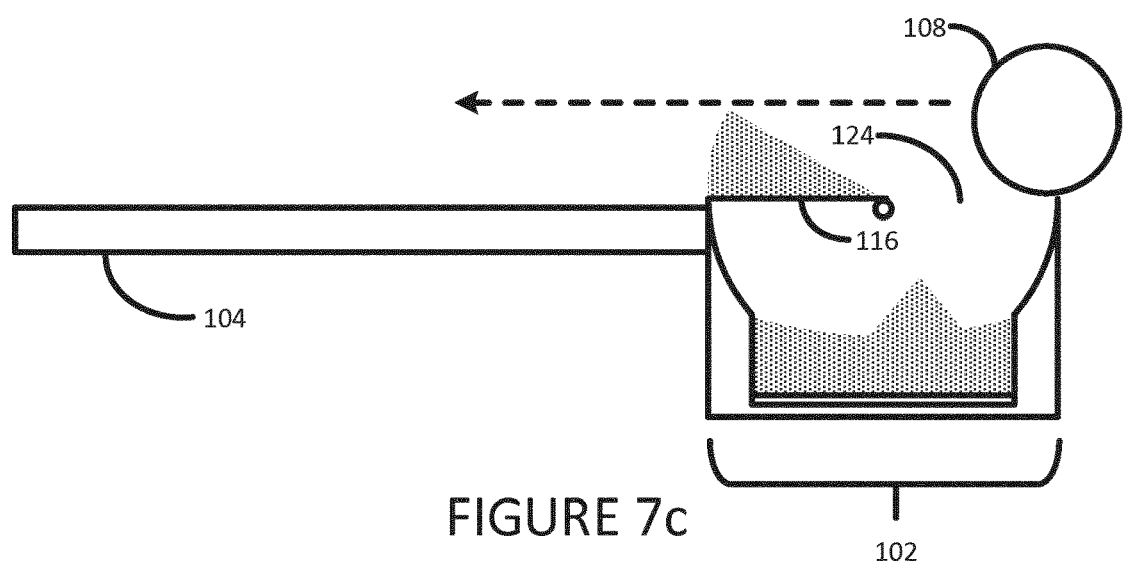
Figure 7D:
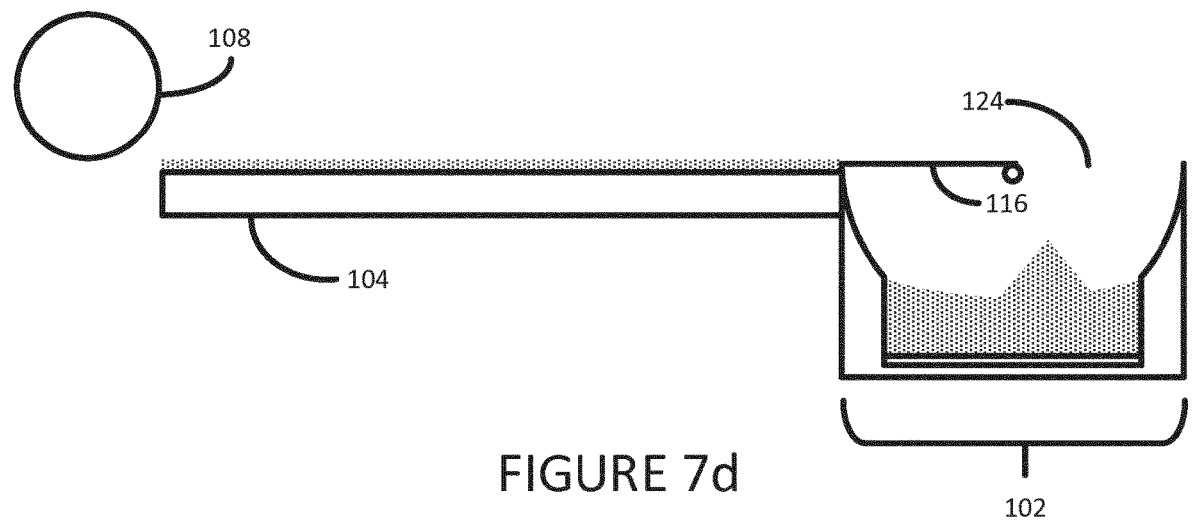

At 310, the controller 126 controls the vane 116 to move to a feed position, as illustrated in FIG. 7c at which the measured dose of build material is positioned level with the top of the supply module 102. The measured dose of build material may then be distributed over support platform 104, which may be positioned slightly below the top of the supply module 102, by the build material spreader 108, as shown in FIG. 7d. The height of the layer of formed build material may be controlled by the vertical position of the support platform 104.

The supply module 102 may then be supplied with additional build material in the manner described above. The resupply of additional build material may be performed whilst the 3D printing system is selectively solidifying portions of the build material on the support platform. In this way processing of successive layers of build material may be performed in an efficient and timely manner.

Figure 8:
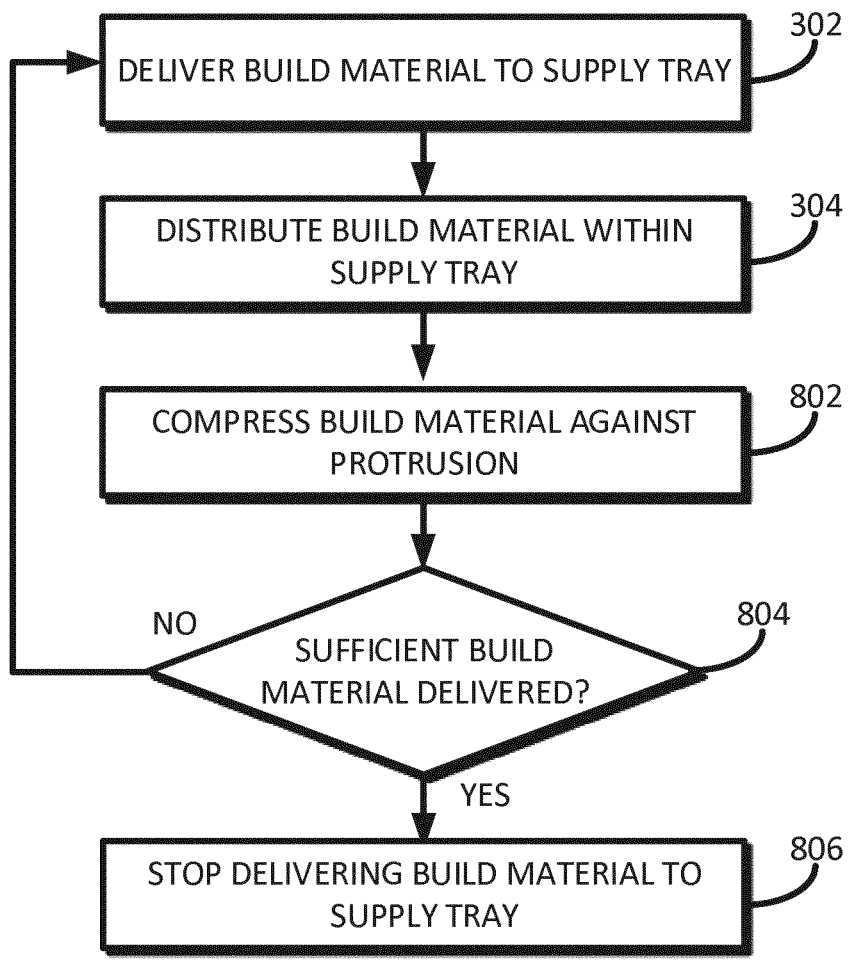
FIG. 8 is a flow diagram outlining an example method according to one example.
Figure 9:
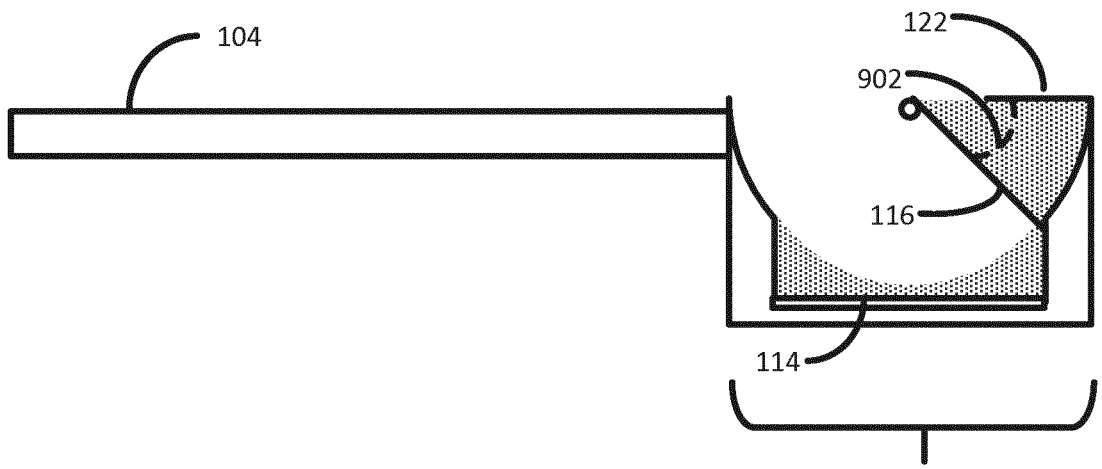
FIG. 9 is a simplified side view illustration of a 3D printing system according to one example.

In another example, for example where the feed mechanism is not controllable to deliver an accurate quantity of build material to the supply module 102 the protrusion 122 may be used to determine when a sufficient quantity of build material has been delivered to the build module 102, as described with additional reference to the flow diagram of FIG. 8, and the illustration of FIG. 9.

At 302, the controller 126 controls the delivery of build material to the supply module 102, for example as described above.

At 304, the controller 126 controls the build material distribution element 114 to reciprocate to evenly distribute the delivered build material 402 along the length of the supply module 102. In one example, as build material is being delivered to the supply module 102, the controller 126 moves the vane 116 to a position, such as a horizontal position.

At 802, the controller 126 controls the vane 116 to rotate towards the protrusion 122, as shown in FIG. 9. If there is sufficient build material in the supply module 102 some of the build material will be scooped up by the vane 116 and will be compressed against the protrusion 122. Since the build material is not compressible by any significant amount the vane 116 becomes blocked at an angular position below the protrusion 122. The controller 126 may then determine the angular position 902 at which the vane 116 becomes blocked, and, at 804, may thus determine whether a predetermined quantity of build material has been delivered to the supply module 102. If not, the controller 126 controls the delivery of additional build material to the supply module 102.

This routine may be performed periodically until the controller 126 determines that there is sufficient build material in the supply module 102.

When the controller 126 does determine that sufficient build material has been delivered to the supply module the controller 126 controls, at 806, the build material supply mechanism to stop supplying build material to the supply module 102. The controller 126 may then perform the previously described actions to provide a measured dose of build material ready to be distributed across the support platform 104.

Figure 10:
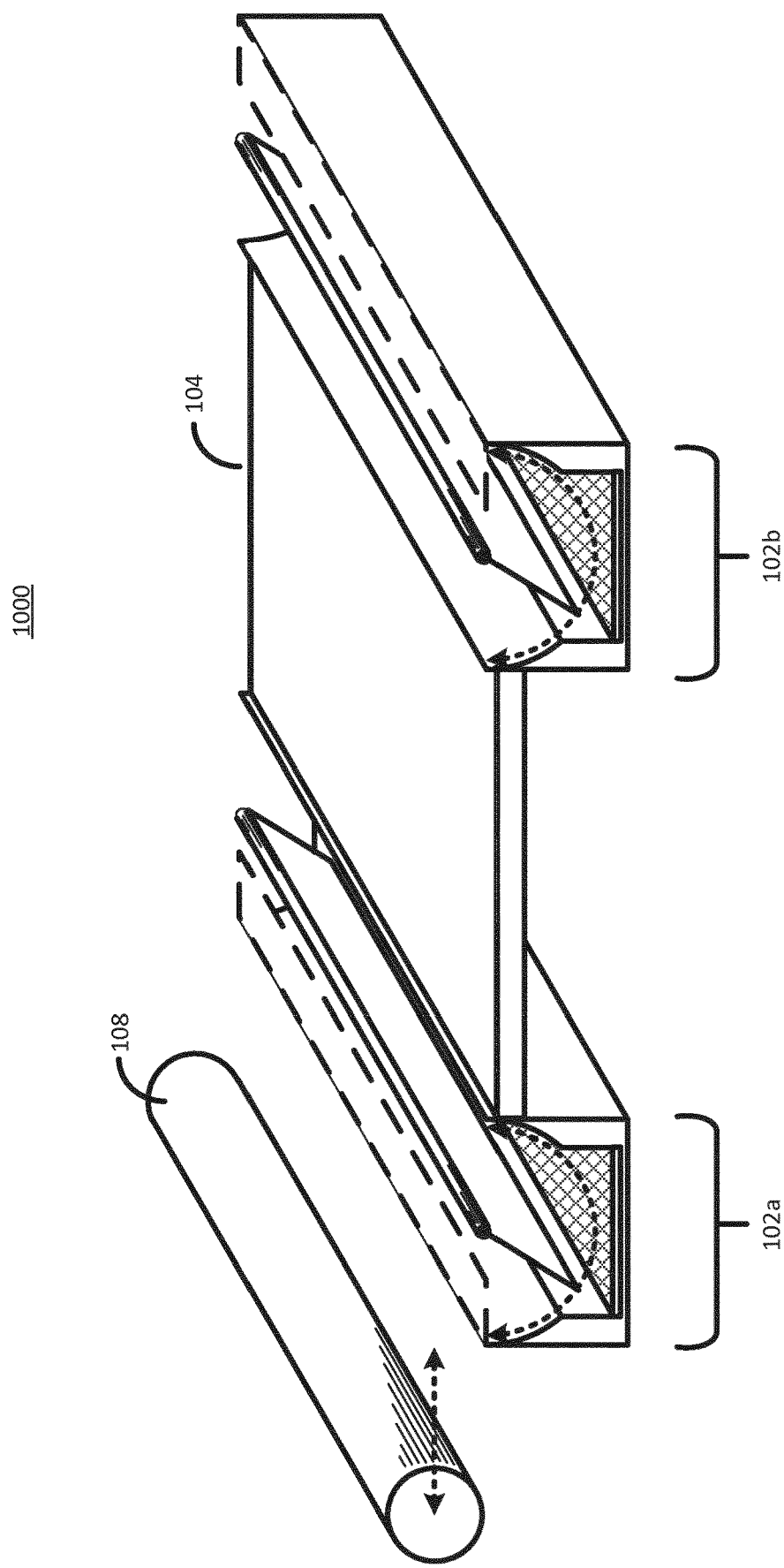
FIG. 10 is a simplified isometric illustration of a 3D printing system according to one example.

A yet further example is illustrated in FIG. 10, which shows an illustration of a portion a portion of a 3D printing system 100 according to one example. In this example a pair of supply modules 102a and 102b are provided on opposite sides of a support platform 104. This example enables build material to be supplied to either side of the support platform 104. Furthermore, any excess build material may be returned to the opposite supply module through the aforementioned void.

In this way, coordination of the control of each supply module 102 may provide enhanced efficiencies when the 3D printing system 1000 is configured to operate in a bi-directional manner. By bi-directional is meant that layer of build material may be formed on the support platform 104 by the build material spreader 108 using build material from either of the build modules 102. The 3D printing system 1000 may also be able to selectively solidify portions of a formed layer of build material whilst operating in either direction.

In one example the support platform 104 may be part of a removable build module that may be insertable into the 3D printing system. Accordingly, reference herein to a support platform will be understood to generally refer to when such a build module is inserted into the 3D printing system.

Figure 11:
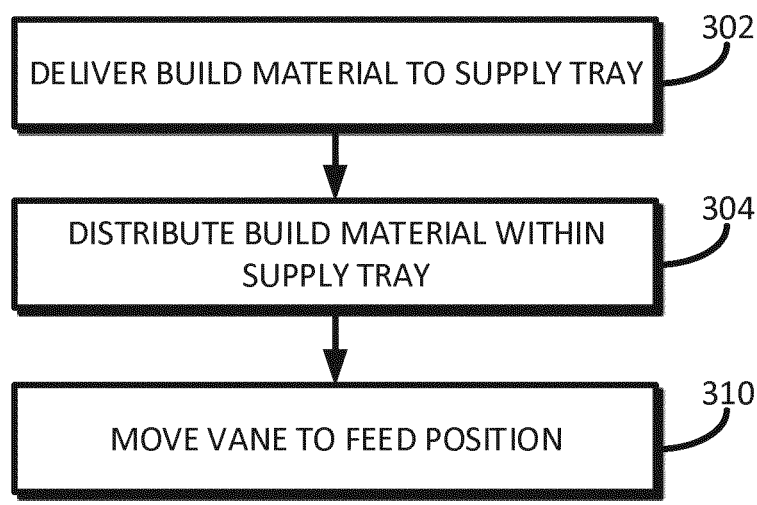
FIG. 11 is a flow diagram outlining an example method according to one example.

In a yet further example, as shown in FIG. 11, the controller 126 may dispense with the pre-feed stage 306 and removal of excess build material stage 308 (described above in relation to FIG. 3) and may control the vane 116 to move it directly to a horizontal feed position. In this example, the dose of quantity of build material provided on the vane 116 may vary each time the vane 116 is moved to the feed position, and any excess build material left over following the forming of a layer of build material on the support platform 104 may recuperated, for example in second supply module on the other side of the support platform 104 (as shown in FIG. 10).

It will be appreciated that examples described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. An apparatus for supplying build material to a three-dimensional printing system, comprising:
a build material supply module having a first side to adjoin a build material support platform in the printing system, the supply module structured such that, when installed in the printing system, a top of the first side of the supply module is above the platform;
and wherein
the supply module includes only one vane, the vane rotatable around and extending away from an axis in only one direction, and the vane rotatable from:
a pre-feed position below the top of the first side of the supply module to hold a portion of build material above the top of the first side of the supply module and a measured dose of build material below the top of the first side of supply module; to
a horizontal feed position level with the top of the first side of the supply module to hold the measured dose of build material above the top of the first side of the supply module.

2. The apparatus of claim 1, further comprising a build material spreader to spread build material from the supply module over the platform and wherein the build material spreader is movable across the supply module in a first direction with the vane in the pre-feed position to push the portion of build material above the top of the supply module into the supply module, thereby leaving the measured dose of build material on the vane between the top of the first side of the supply module and the vane.

3. The apparatus of claim 2, wherein the build material spreader is movable across the vane in a second direction opposite to the first direction with the vane in the feed position to spread the measured dose of build material over the platform.

4. The apparatus of claim 1, further comprising a build material delivery system to deposit build material from a build material store to the build material supply module.

5. The apparatus of claim 4, wherein the supply module includes a spreading mechanism to distribute deposited build material within the supply module and wherein the spreading mechanism comprises a reciprocating member that can reciprocate along a base of the supply module.

6. An apparatus for supplying build material to a three-dimensional printing system, comprising:
 a build material supply module;
 a build material delivery system to deposit build material from a build material store to the build material supply module;
 a spreading mechanism to distribute deposited build material within the supply module;
 a vane rotatable in a first direction to move a quantity of build material in the supply module above a top of the supply module; and
 a protrusion along a length of one side of the supply module, and wherein the vane is movable in a second direction opposite to the first direction to compress a quantity of build material between the vane and the protrusion, the apparatus further comprising a measurement module to determine an angle of the vane when the vane compresses the build material against the protrusion, the angle indicative of a quantity of build material within the supply module.

7. A 3D printing system comprising:
 a platform to support layers of build material during printing, the platform movable vertically to control a height of each layer of build material spread over the platform;
 a supply module to receive build material from a build material store, the supply module positioned next to the platform such that, during printing, a top of the first side of the supply module is above the platform the supply module including a rotatable blade;
 a build material spreader to spread build material from the supply module over the platform; and
 a controller to:
  control the deposition of build material in the supply module from the build material store;
  control the blade to rotate from:
   a pre-feed position below the top of the first side of the supply module to hold a first portion of build material above the top of the first side of the supply module and a second portion of build material below the top of the first side of supply module; to
   a horizontal feed position level with the top of the first side of the supply module to hold the second portion of build material above the top of the first side of the supply module; and
  control the build material spreader to move:
   across the supply module in a first direction with the blade in the pre-feed position to push the first portion of build material into the supply module and leaving the second portion of build material on the blade between the top of the first side of the supply module and the blade; and
   across the supply module in a second direction opposite to the first direction with the blade in the feed position to spread the second portion of build material over the platform.

8. The 3D printing system of claim 7, wherein the controller controls the blade to reciprocate as build material is deposited in the supply module to assist in the distribution of build material along the length of the supply module.

9. The 3D printing system of claim 8, wherein the supply module further comprises a protrusion along a length of a second side of the supply module opposite the first side, and wherein the controller is to control the blade to compress a portion of build material against the protrusion and to determine from an angle of the blade a quantity of build material in the supply module.

10. The apparatus of claim 7, wherein the blade is only one blade rotatable around and extending away from an axis in only one direction.

11. The apparatus of claim 10, comprising a spreader to distribute build material within the supply module and wherein the controller is to control the spreader to distribute build material along a length of the supply module.

* * * * *